(12) United States Patent
Yang (10) Patent No.: US 9,520,767 B2
(45) Date of Patent: Dec. 13, 2016

(54) PROTECTION CIRCUIT FOR POWER CONVERTER

(75) Inventor: Ta-Yung Yang, Milpitas, CA (US)

(73) Assignee: Fairchild (Taiwan) Corporation, Taipei (TW)

( * ) Notice: Subject to any disclaimer, the term of this patent is extended or adjusted under 35 U.S.C. 154(b) by 284 days.

(21) Appl. No.: 13/606,025

(22) Filed: Sep. 7, 2012

(65) Prior Publication Data

US 2013/0063990 A1    Mar. 14, 2013

Related U.S. Application Data

(60) Provisional application No. 61/534,079, filed on Sep. 13, 2011.

(51) Int. Cl.
*H02H 7/122* (2006.01)
*H02M 1/32* (2007.01)
(Continued)

(52) U.S. Cl.
CPC ........... *H02M 1/32* (2013.01); *H02M 3/33523* (2013.01); *H02H 7/1216* (2013.01)

(58) Field of Classification Search
CPC ........ H02M 7/10; H02M 7/12; H02M 7/1222; H02M 7/1225; H02M 7/1227; H02M 7/122; H02M 7/125; H02M 3/22; H02M 3/335; H02M 3/33507; H02M 3/3353; H02M 3/3358; H02M 3/33561; H02M 3/33569; H02M 3/337; H02M 3/338; H02M 2001/0009; H02M 1/34; H02M 1/32; H02M 1/322; H02M 1/325; H02M 1/327; H02M 1/36; H02M 7/42; H02M 7/537; H02M 7/538; H02M 7/5383; H02M 7/5387; H02M 7/53871; H02M 7/539; H02M 3/33523; H02M 2001/322;H02M 2001/325; H02M 7/48; H02M 7/53; H02M 7/5395; H02M 2007/4815; H02M 2007/4818; H02M 7/5375; H02H 3/20; H02H 3/207; H02H 9/041; H02H 7/1216; H02H 9/04
(Continued)

(56) References Cited

U.S. PATENT DOCUMENTS 5,812,383 A * 9/1998 Majid et al. ............... 363/21.05
5,982,640 A * 11/1999 Naveed et al. ............. 363/21.15
(Continued)

FOREIGN PATENT DOCUMENTS

CN    101159416    4/2008
CN    102044978 A  5/2011

OTHER PUBLICATIONS

"First Office Action of China Counterpart Application", issued on Apr. 1, 2014, p. 1-p. 6.
(Continued)

*Primary Examiner* — Timothy J Dole
*Assistant Examiner* — Carlos Rivera-Perez
(74) *Attorney, Agent, or Firm* — Jianq Chyun IP Office (57) ABSTRACT

A protection circuit of a power converter without an input capacitor is disclosed. The protection circuit comprises a high voltage switch, a detection circuit and a control circuit. The switch senses an input voltage of the power converter via a resistor for generating a first signal. The detection circuit coupled to a transformer senses the input voltage of the power converter for generating a second signal. The control circuit controls a switching signal in response to the first signal and the second signal. The switching signal is utilized to switching the transformer for regulating the power converter; and the level of the first signal and the second signal is correlated a level of the input voltage of the power converter.

8 Claims, 7 Drawing Sheets

(51) Int. Cl.
*H02M 3/335* (2006.01)
*H02H 7/12* (2006.01)

(58) Field of Classification Search
USPC ............ 363/21.04–21.18, 49–58, 78–80, 89,
106,363/108, 109, 21.02–21.18, 40–43,
95–99, 120,363/131–134, 15–21.18;
323/271–280, 323/282–287, 299–303,
351, 901, 908, 323/205–211; 361/18, 78,
79, 86–92, 59–61, 361/71–75
See application file for complete search history.

(56) References Cited

U.S. PATENT DOCUMENTS

| | | |
|---|---|---|
| 7,016,204 B2 | 3/2006 | Yang et al. |
| 7,345,895 B2 * | 3/2008 | Zhu et al. ................... 363/21.12 |
| 7,394,670 B2 * | 7/2008 | Koike ........................ 363/21.16 |
| 7,486,528 B2 * | 2/2009 | Yang ......................... 363/21.12 |
| 7,671,578 B2 | 3/2010 | Li et al. |
| 8,780,515 B2 * | 7/2014 | Chien et al. ..................... 361/90 |
| 2005/0146903 A1 * | 7/2005 | Yang et al. ................. 363/21.15 |
| 2008/0012547 A1 | 1/2008 | Li et al. |
| 2008/0170420 A1 * | 7/2008 | Yang et al. ...................... 363/50 |
| 2008/0278973 A1 * | 11/2008 | Lin et al. .................... 363/21.08 |
| 2009/0257251 A1 * | 10/2009 | Su et al. ..................... 363/21.15 |
| 2011/0069420 A1 * | 3/2011 | Chiu et al. ................... 361/91.1 |
| 2011/0279101 A1 * | 11/2011 | Sasaki .................... H02M 1/32 |
| | | 323/271 |

OTHER PUBLICATIONS

"Office Action of China Counterpart Application", issued on Nov. 21, 2014, p. 1-p. 7.

* cited by examiner

PROTECTION CIRCUIT FOR POWER CONVERTER

CROSS-REFERENCE TO RELATED APPLICATION

This application claims the priority benefits of U.S. provisional application Ser. No. 61/534,079, filed on Sep. 13, 2011. The entirety of the above-mentioned patent application is hereby incorporated by reference herein and made a part of this specification.

BACKGROUND OF THE INVENTION

Field of the Invention

The present invention relates to a power converter, and particularly relates to a protection circuit for a power converter without an input capacitor.

Background of the Invention

A power converter is an electrical or electro-mechanical device for converting electrical energy. Generally speaking, an input capacitor of the power converter is utilized to store the electrical energy and provide a minimum input voltage to guarantee the power converter can operate properly. The requirements for electronic products from customers today are to be slim, to have long life cycle, and to cost less. Therefore, a power converter without an input capacitor can meet those requirements. However, a power converter without an input capacitor causes difficulty in input over-voltage and under-voltage protection (such as protection from brownout), etc. Therefore, to overcome the above problems in design of a power converter without an input capacitor is desired.

SUMMARY OF THE INVENTION

The present invention provides a protection circuit for a power converter without an input capacitor. The protection circuit comprises a high voltage switch, a detection circuit and a control circuit. The high voltage switch senses an input voltage of the power converter via a high voltage resistor for generating a first signal. The detection circuit coupled to a transformer senses the input voltage of the power converter for generating a second signal. The control circuit controls a switching signal in response to the first signal and the second signal. The switching signal is utilized to switch the transformer for regulating the power converter; and the levels of the first signal and the second signal are correlated a level of the input voltage of the power converter.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DETAILED DESCRIPTION OF EMBODIMENTS

Figure 1:
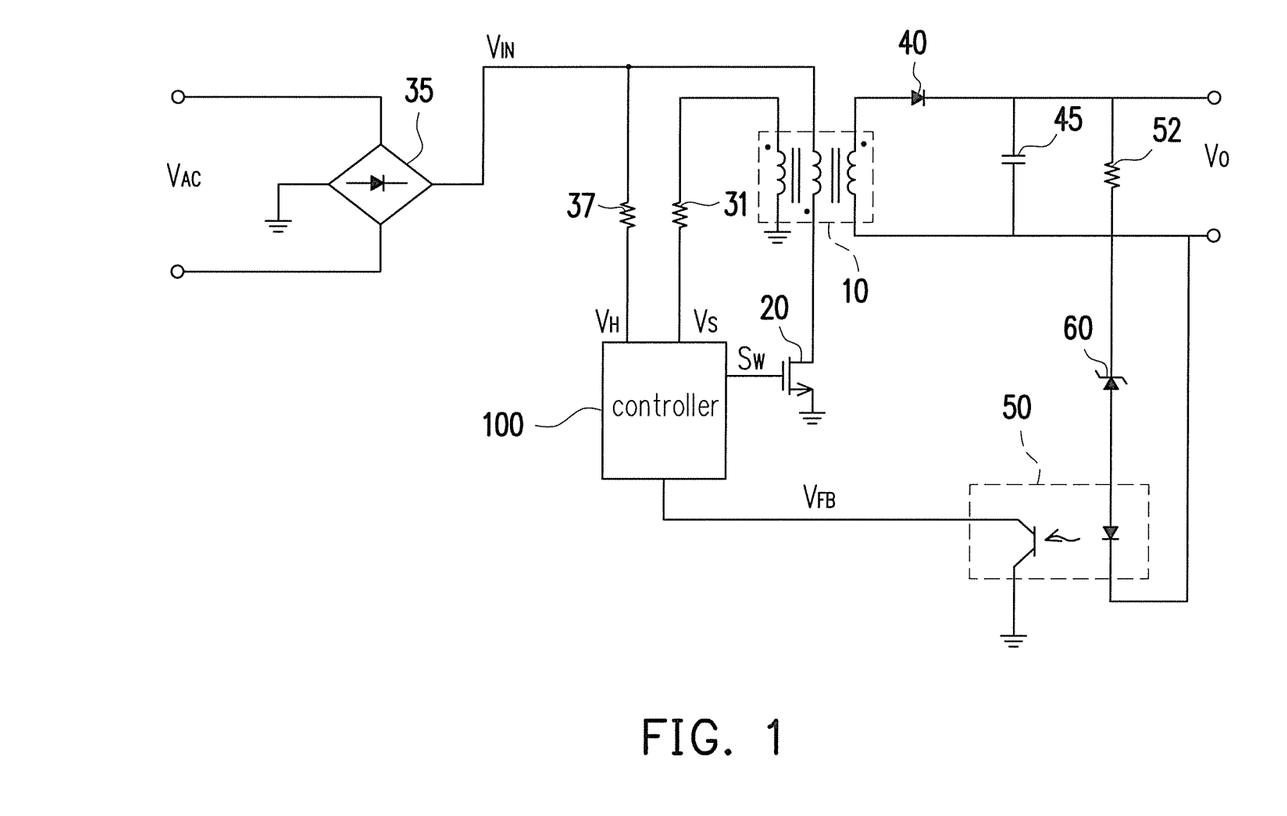
FIG. 1 shows a schematic view illustrating one embodiment of a power converter without an input capacitor according to the present invention.

FIG. 1 shows a schematic view illustrating one embodiment of a power converter without an input capacitor according to the present invention. A bridge rectifier 35 rectifies the input AC voltage $V_{AC}$ to a DC input voltage $V_{IN}$. A controller 100 generates a switching signal $S_W$ to switch a transformer 10 via a power transistor 20. The switching signal $S_W$ is generated in accordance with a feedback signal $V_{FB}$ for regulating the output of the power converter. The feedback signal $V_{FB}$ is coupled to the output of the power converter through a resistor 52, a voltage-regulator 60 (zener diode) and an opto-coupler 50. In other words, the switching signal is generated by a secondary-side controlled controller 100 in the embodiment of the present application. A rectifier 40 and a capacitor 45 are coupled to the secondary winding of the transformer 10 for generating the output voltage $V_O$ of the power converter.

A resistor 37 is coupled from the input voltage $V_{IN}$ to the controller 100 for detecting the level of the input voltage $V_{IN}$ and generating a signal $V_H$. A resistor 31 is coupled from an auxiliary winding of the transformer 10 to the controller 100 for further detecting the input voltage $V_{IN}$ and generating a signal $V_S$ during the switching of the transformer 10.

Figure 2:
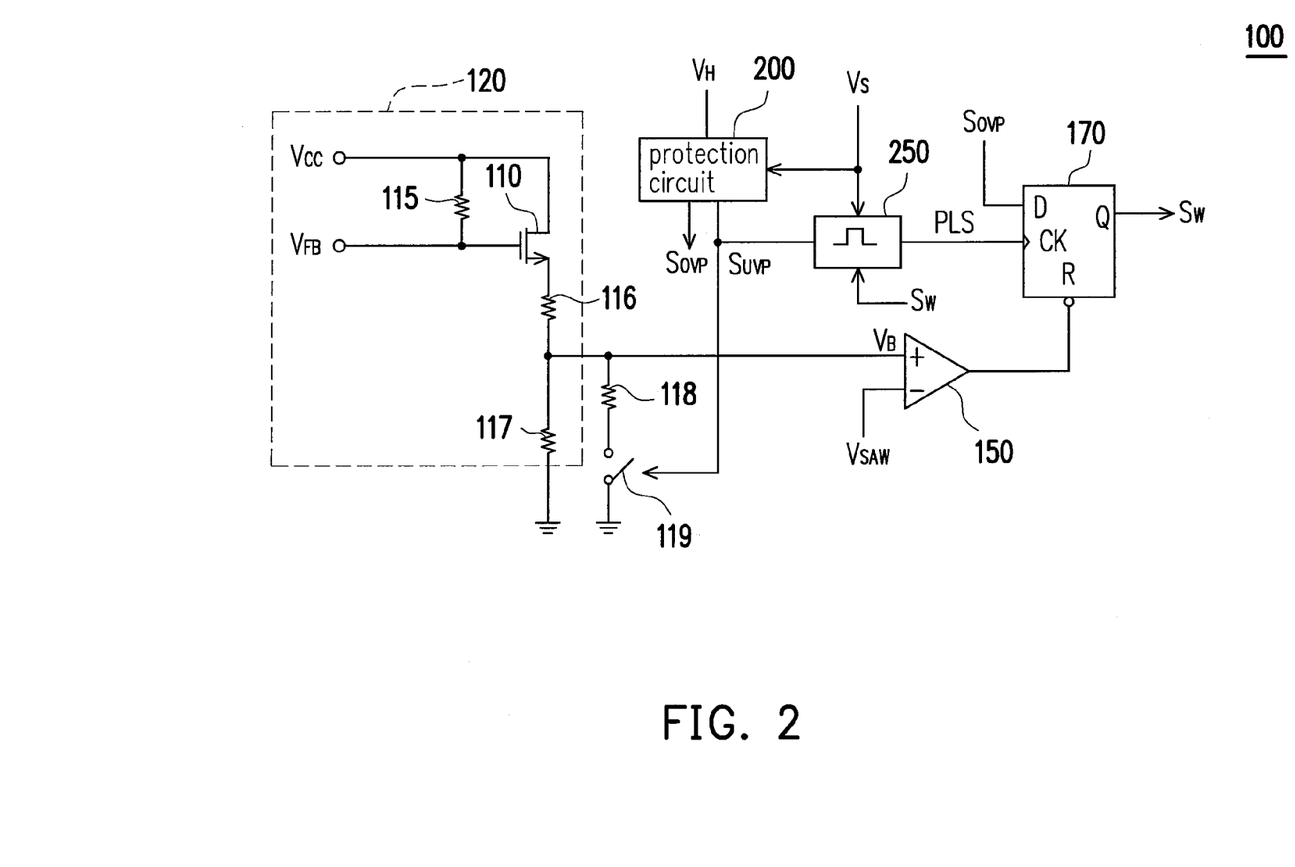
FIG. 2 shows a block diagram illustrating one embodiment of a controller according to the present invention.

FIG. 2 shows a block diagram illustrating one embodiment of the controller 100 according to the present invention. A transistor 110 and resistors 115, 116, 117 develop a level-shift input circuit 120 configured to receive the feedback signal $V_{FB}$ and power voltage $V_{CC}$ for generating a signal $V_B$. The signal $V_B$ is coupled to a comparator 150 to compare with a saw-tooth signal $V_{SAW}$ and generate a signal to reset a flip-flop 170 for turning off the switching signal $S_W$, wherein the saw-tooth signal $V_{SAW}$ is provided by a saw-tooth signal generator. The flip-flop 170 is turned on by a pulse signal PLS for generating the switching signal $S_W$. The pulse signal PLS is generated by a pulse generation circuit 250 in response to the signal $V_S$ (the signal of an auxiliary winding of the transformer 10). A protection circuit 200 is configured to receive the signals $V_H$ and $V_S$ for generating an over-voltage protection signal $S_{OVP}$ and an under-voltage protection signal $S_{UVP}$. The over-voltage protection signal $S_{OVP}$ is coupled to the flip-flop 170 for disabling the switching signal $S_W$. When the over-voltage protection signal $S_{OVP}$ is enabled (active-low), the switching signal $S_W$ will be disabled. The protection signal $S_{UVP}$ (active-high) is configured to control the pulse generation circuit 250 and control a switch 119. The switch 119 controls a resistor 118 coupled to the signal $V_B$. Therefore, the frequency of the switching signal $S_W$ decreases in response to enabling the protection signal $S_{UVP}$. Furthermore, the level of the signal $V_B$ and the pulse width of the switching signal $S_W$ reduce once the protection signal $S_{UVP}$ is enabled.

Figure 3:
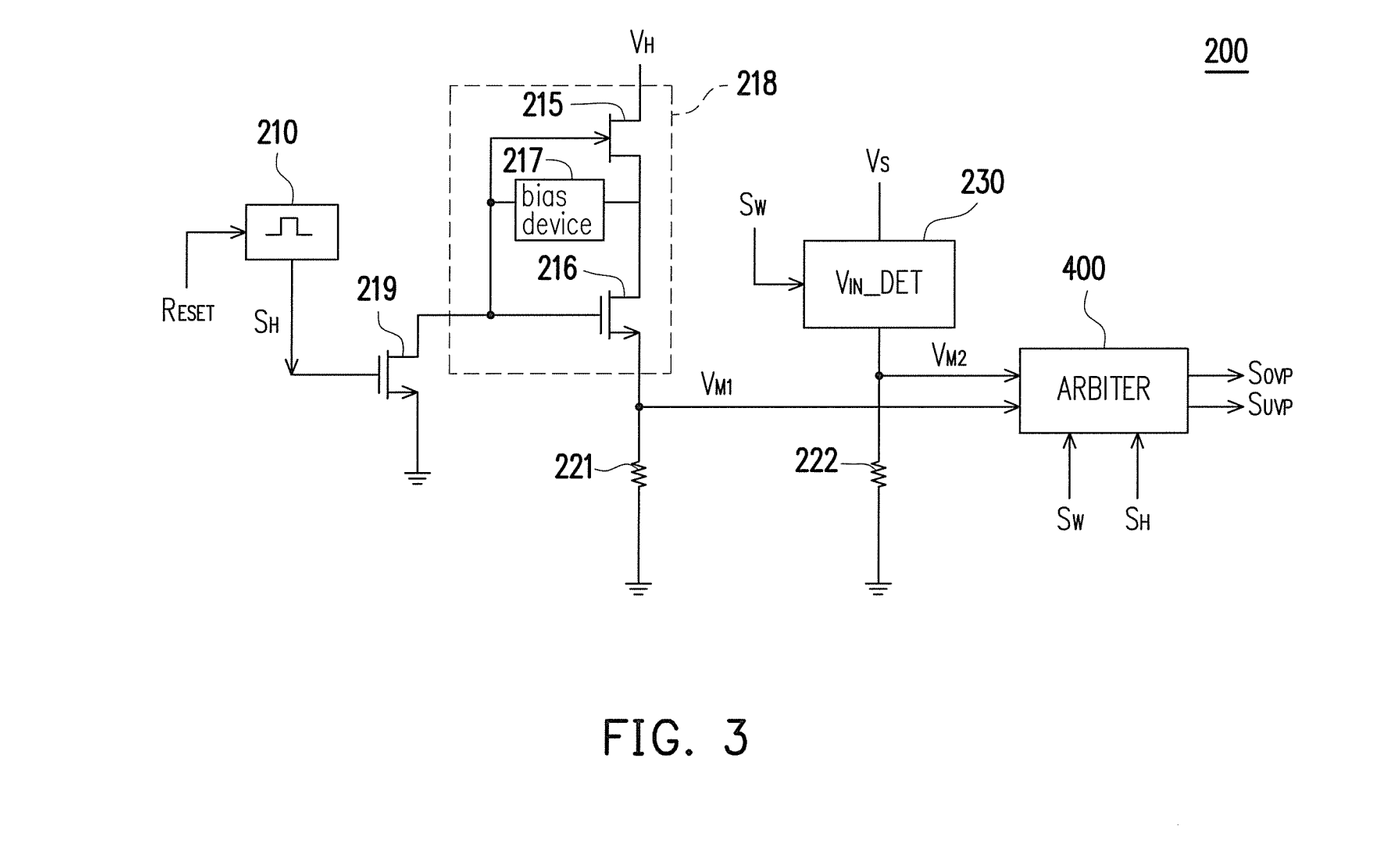
FIG. 3 shows a block diagram illustrating one embodiment of a protection circuit according to the present invention.
Figure 5:
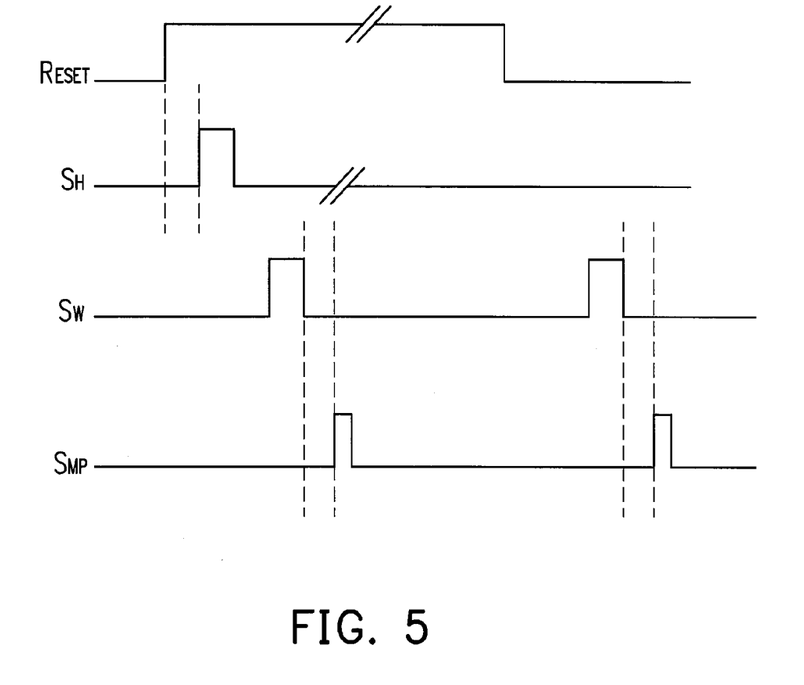
FIG. 5 shows waveforms of a reset signal $R_{ESET}$, a signal $S_H$, a switching signal $S_W$ and a sample signal $S_{MP}$ according to the present invention.

FIG. 3 shows a block diagram illustrating one embodiment of the protection circuit 200 according to the present invention. A high-voltage JFET transistor 215, a bias device 217 and a transistor 216 develop a high-voltage switch 218 to control the signal $V_H$ for generating a first signal $V_{M1}$. Once the high-voltage switch 218 is turned on, the high voltage resistor 37 (shown in FIG. 1) and resistor 221 form a voltage divider to generate the first signal $V_{M1}$. A transistor 219 is coupled to control the on/off of the high voltage switch. A reset signal $R_{ESET}$ generates a signal $S_H$ through a pulse generator 210. The waveform of the reset signal $R_{ESET}$ and the signal $S_H$ are shown in FIG. 5. FIG. 5 shows waveforms of the reset signal $R_{ESET}$, the signal $S_H$, the switching signal $S_W$ and the sample signal $S_{MP}$ according to the present invention. The reset signal $R_{ESET}$ is generated as a low-to-high signal when the power voltage $V_{CC}$ is applied to the controller 100.

An input-voltage detection circuit ($V_{IN}$_DET) 230 is coupled to sense the input voltage $V_{IN}$ via the signal $V_S$ for generating a signal $V_{M2}$. The detailed operation of the input voltage detector 230 can be found in the prior art of "Detection circuit for sensing the input voltage of transformer", U.S. Pat. No. 7,671,578. The levels of the signals $V_{M1}$ and $V_{M2}$ are correlated to the level of the input voltage $V_{IN}$. The switching signal $S_W$ and the signals $V_{M1}$, $V_{M2}$, and $S_H$ are further coupled to an arbiter circuit 400 for generating the protection signals $S_{OVP}$ and $S_{UVP}$. The arbiter circuit 400 is also referred as a control circuit of the protection circuit 200.

Figure 4:
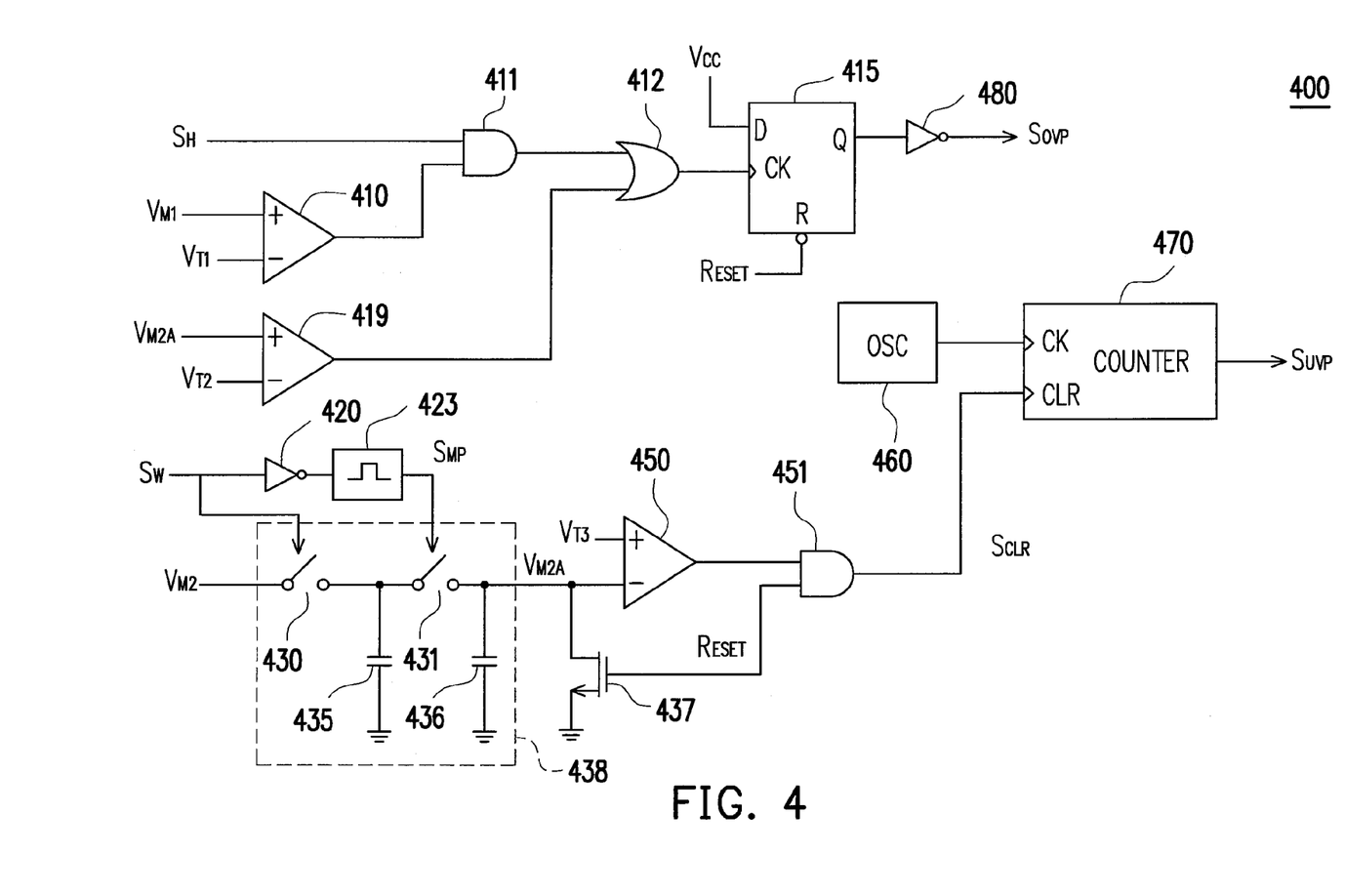
FIG. 4 shows a block diagram illustrating one embodiment of an arbiter circuit according to the present invention.

FIG. 4 shows a block diagram illustrating one embodiment of an arbiter circuit 400 according to the present invention. The signal $V_{M2}$ is sampled into a capacitor 435 via a switch 430 during the turn-on period of switching signal $S_W$. Once the switching signal $S_W$ is turned off, a sample signal $S_{MP}$ is generated by the switching signal $S_W$ through an inverter 420 and a pulse generator 423. The waveform of the switching signal $S_W$ and the sample signal $S_{MP}$ are shown in FIG. 5. The sample signal $S_{MP}$ controls a switch 431 to further sample the signal from the capacitor 435 to a capacitor 436. The switches 430, 431, and the capacitors 435, 436 form a low-pass filter 438 for generating a second signal $V_{M2A}$ from the signal $V_{M2}$. Thus, the second signal $V_{M2A}$ is generated during the switching of the transformer in response to enabling of the switching signal $S_W$.

A comparator 410 having a threshold $V_{T1}$ is configured to compare with the first signal $V_{M1}$. A comparator 419 having a threshold $V_{T2}$ is configured to compare with the second signal $V_{M2A}$. The signal $S_H$ and the output of the comparator 410 are connected to a AND gate 411. The output of the AND gate 411 and the output of the comparator 419 are connected to an OR gate 412. The OR gate 412 is configured to enable a flip-flop 415 once the first signal $V_{M1}$ is higher than the threshold $V_{T1}$ and/or the second signal $V_{M2A}$ is higher than the threshold $V_{T2}$. The output of the flip-flop 415 generates the over-voltage protection signal $S_{OVP}$ via an inverter 480.

The second signal $V_{M2A}$ is further coupled to a comparator 450 to compare with a threshold $V_{T3}$. The output of the comparator 450 and the reset signal $R_{ESET}$ are coupled to an AND gate 451 to generate a clear signal $S_{CLR}$. The clear signal $S_{CLR}$ is further coupled to clear (reset) a counter 470. An oscillator (OSC) 460 generates a clock signal coupled to the counter 470. Therefore, once the reset signal $R_{ESET}$ is disabled (logic-high) and the second signal $V_{M2A}$ is lower than the threshold $V_{T3}$, the counter will start to count. The under-voltage protection signal $S_{UVP}$ will be latched to an enable-state once the counter 470 is expired. The latch-state of the under-voltage protection signal $S_{UVP}$ can be cleared until the reset signal $R_{ESET}$ is enabled or the second signal $V_{M2A}$ is higher than the threshold $V_{T3}$. Thus, the counter 470 provides a de-bounce time (a delay time) to generate the under-voltage protection signal $S_{UVP}$ for the $V_{IN}$.

Figure 6:
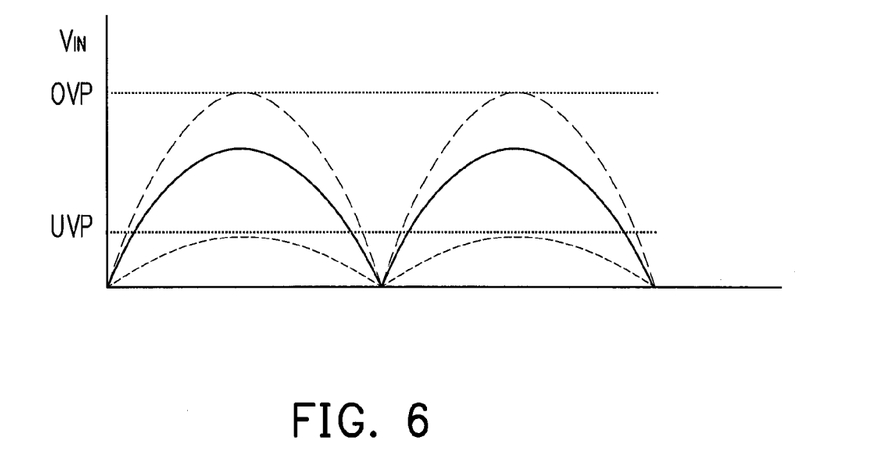
FIG. 6 shows the waveform of the input voltage $V_{IN}$ according to the present invention.

FIG. 6 shows the waveform of the input voltage $V_{IN}$ according to the present invention. The switching signal $S_W$ will be disabled immediately once the input voltage $V_{IN}$ is higher than an OVP threshold. The pulse width of the switching signal $S_W$ will be reduced and the frequency of the switching signal $S_W$ will be decreased to limit the power of the switching circuit once the under-voltage protection signal $S_{UVP}$ is enabled. The under-voltage protection signal $S_{UVP}$ will be enabled once the input voltage $V_{IN}$ is lower than an UVP threshold and continues for the de-bounce period of the counter 470. Usually, the de-bounce period lasts for more than 30 msec. The OVP threshold is related to the thresholds $V_{T1}$ and $V_{T2}$. The UVP threshold is correlated to the threshold $V_{T3}$.

Figure 7:
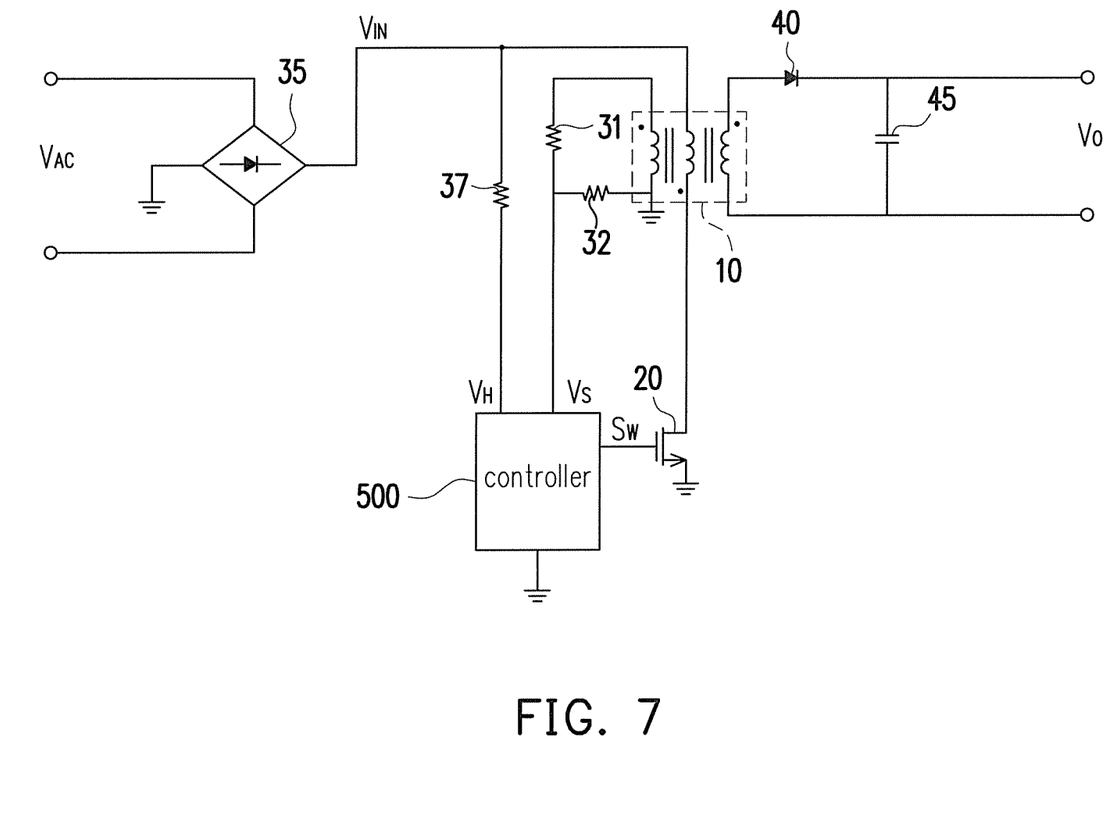
FIG. 7 shows a schematic diagram illustrating another embodiment of a primary-side controlled power converter without the input capacitor according to the present application.

FIG. 7 shows a schematic diagram illustrating another embodiment of a power converter without the input capacitor according to the present application. The embodiment shown in FIG. 7 is a primary-side controlled power converter without the input capacitor, in which the feedback signal is developed through the resistors 31 and 32 by sensing the auxiliary winding of the transformer 10. A controller 500 generates the switching signal $S_W$ by sensing the auxiliary winding of the transformer 10. In other words, the switching signal is generated by a primary-side controlled controller 500 in the embodiment of the present application.

Figure 8:
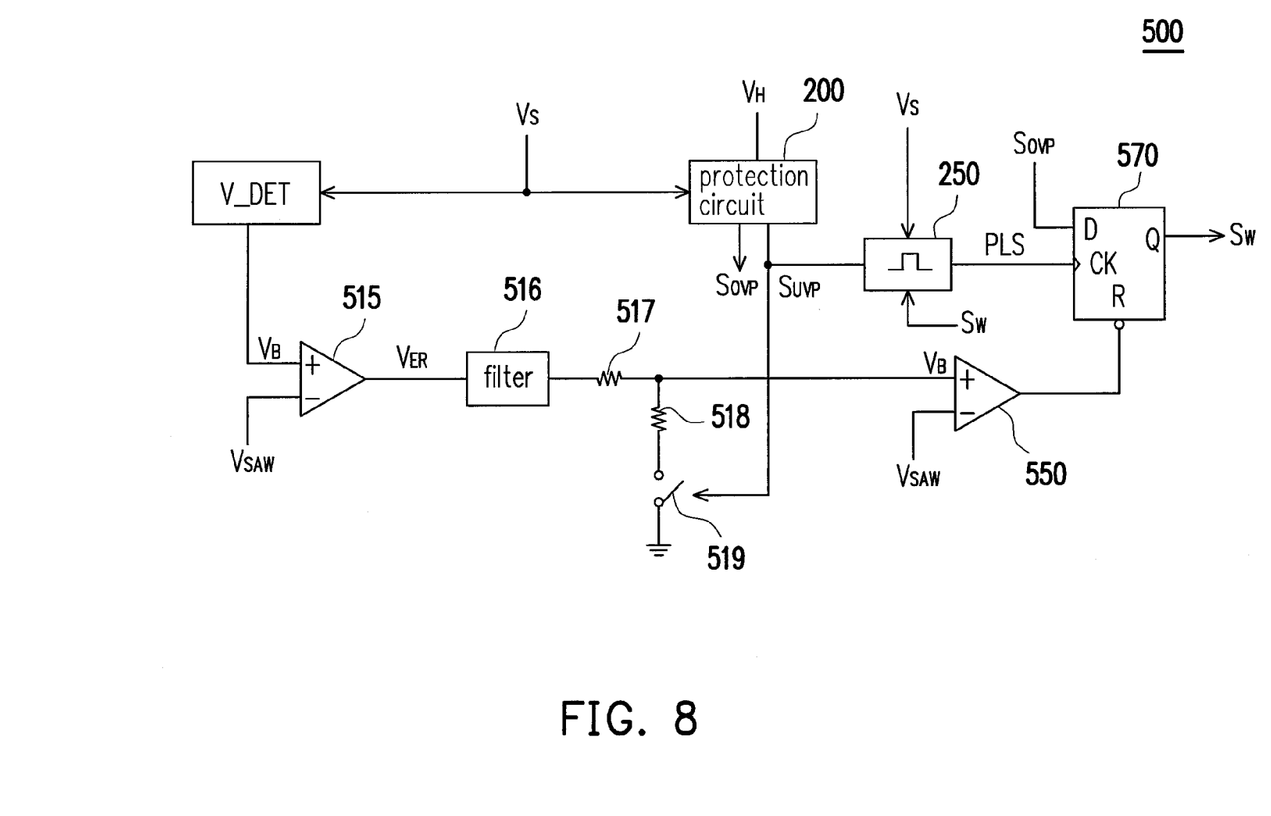
FIG. 8 shows a block diagram illustrating another embodiment of the controller according to the present application.

FIG. 8 shows a block diagram illustrating another embodiment of the controller 500 according to the present application, in which a reflected-voltage detection circuit (V_DET) 510 generates a signal coupled to an error amplifier 515 by sampling the signal $V_S$. The detailed operation of the primary-side controller power converter can be found in the prior art of "Close-loop PWM controller for primary-side controlled power converters", U.S. Pat. No. 7,016,204.

The output $V_{ER}$ of the error amplifier 515 generates the signal $V_B$ via a filter 516. The filter 516 is configured to compensate a feedback loop. The signal $V_B$ is coupled to a comparator 550 to compare with a saw-tooth signal $V_{SAW}$ and generate a signal to reset a flip-flop 570 for turning off the switching signal $S_W$. The flip-flop 570 is turned on by the pulse signal PLS for generating the switching signal $S_W$. The pulse signal PLS is generated by a pulse generation circuit 250 in response to a signal $V_S$ (the signal of an auxiliary winding of the transformer 10). The over-voltage protection signal $S_{UVP}$ is configured to control the pulse generation circuit 250 and control a switch 519. The switch 519 controls a resistor 518 coupled to the signal $V_B$. Therefore, the frequency of the pulse signal PLS decreases in response to enabling the under-voltage protection signal $S_{UVP}$. Furthermore, the level of the signal $V_B$ and the pulse width of the switching signal $S_W$ reduce once the under-voltage protection signal $S_{UVP}$ is enabled.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A protection circuit of a power converter, comprising:
a switch configured to sense an input voltage of the power converter via a resistor for generating a first signal;
a detection circuit coupled to a transformer to sense the input voltage of the power converter for generating a second signal;
a control circuit configured to control a switching signal in response to the first signal and the second signal;
wherein the switching signal is utilized to switching the transformer for regulating the power converter; a level of the first signal and the second signal is correlated to a level of the input voltage of the power converter,
wherein the detection circuit receives the switching signal, and the second signal is generated in response to the enable of the switching signal,
wherein when a power voltage is applied to the protection circuit, the protection circuit generates a pulse signal for over voltage protection; an over-voltage signal is generated when the pulse signal is at an enable state and the first signal is higher than a first threshold, wherein the over-voltage signal is coupled to disable the switching signal,
wherein the switch is controlled by the pulse signal and is turned on in response to enablement of the pulse signal so as to generate the first signal accordingly.

2. The protection circuit as claimed in claim 1, further comprising a low-pass filter for the generation of the second signal.

3. The protection circuit as claimed in claim 1, in which the switching signal is generated by a primary-side controlled controller.

4. The protection circuit as claimed in claim 1, in which the over-voltage signal is further generated once the second signal is higher than a second threshold; an under-voltage signal is generated once the second signal is lower than a third threshold, wherein the under-voltage signal is coupled to limit the switching signal.

5. The protection circuit as claimed in claim 1, in which the first signal is generated in response to turn on of the protection circuit.

6. The protection circuit as claimed in claim 1, in which the control circuit further comprising a de-bounce circuit providing a delay time for generating an under-voltage signal once the second signal is lower than a third threshold.

7. The protection circuit as claimed in claim 1, in which a switching frequency of the switching signal is decreased in response to an enable of an under-voltage signal.

8. The protection circuit as claimed in claim 1, in which the second signal is generated during the switching of the transformer.

* * * * *